United States Patent
Tsujino

(10) Patent No.: US 8,670,055 B2
(45) Date of Patent: Mar. 11, 2014

(54) IMAGE PICKUP LENS, CAMERA MODULE USING THE SAME, IMAGE PICKUP LENS MANUFACTURING METHOD AND CAMERA MODULE MANUFACTURING METHOD

(75) Inventor: Kazuya Tsujino, Aichi (JP)

(73) Assignee: Sony Corporation (JP)

( * ) Notice: Subject to any disclaimer, the term of this patent is extended or adjusted under 35 U.S.C. 154(b) by 307 days.

(21) Appl. No.: 12/928,342

(22) Filed: Dec. 9, 2010

(65) Prior Publication Data

US 2011/0149143 A1 Jun. 23, 2011

(30) Foreign Application Priority Data

Dec. 17, 2009 (JP) ................ P2009-286463

(51) Int. Cl.
  H04N 3/14    (2006.01)
  H04N 5/335   (2011.01)
  H01L 27/14   (2006.01)
  H01L 31/0232 (2006.01)
  H01L 31/0203 (2006.01)
  H01L 27/00   (2006.01)
  H01L 21/00   (2006.01)

(52) U.S. Cl.
  USPC .......... 348/294; 257/431; 257/432; 257/433; 250/208.1; 438/69; 438/74

(58) Field of Classification Search
  USPC ................ 348/294; 257/428–466; 250/208.1–208.6; 438/69–81
  See application file for complete search history.

(56) References Cited

U.S. PATENT DOCUMENTS

| | | | |
|---|---|---|---|
| 7,551,358 B2 * | 6/2009 | Lee et al. ............. | 359/621 |
| 8,233,141 B2 * | 7/2012 | Kim et al. ............ | 355/71 |
| 8,542,309 B2 * | 9/2013 | Yamada et al. ....... | 348/340 |
| 2005/0219717 A1 * | 10/2005 | Uehira et al. ........ | 359/793 |
| 2007/0166029 A1 * | 7/2007 | Lee et al. ............. | 396/529 |
| 2007/0284511 A1 * | 12/2007 | Toyoda et al. ........ | 250/208.1 |
| 2008/0007623 A1 * | 1/2008 | Lee et al. ............. | 348/207.99 |
| 2009/0102959 A1 * | 4/2009 | Chen et al. ........... | 348/340 |
| 2010/0032781 A1 * | 2/2010 | Ryu ..................... | 257/432 |
| 2010/0073534 A1 * | 3/2010 | Yano et al. ........... | 348/294 |
| 2010/0309368 A1 * | 12/2010 | Choi et al. ........... | 348/360 |
| 2010/0328743 A1 * | 12/2010 | Wolterink et al. .... | 359/19 |
| 2011/0032409 A1 * | 2/2011 | Rossi et al. .......... | 348/340 |
| 2011/0037887 A1 * | 2/2011 | Lee et al. ............. | 348/340 |
| 2011/0211105 A1 * | 9/2011 | Yamada et al. ....... | 348/340 |
| 2011/0221950 A1 * | 9/2011 | Oostra et al. ......... | 348/335 |
| 2012/0068292 A1 * | 3/2012 | Ikeda et al. .......... | 257/432 |

FOREIGN PATENT DOCUMENTS

| | | | | |
|---|---|---|---|---|
| JP | 2009-251367 A | | 10/2009 | |
| JP | 2009-251368 A | | 10/2009 | |
| WO | WO2009/082201 | * | 7/2009 | ............ B29D 11/00 |

* cited by examiner

*Primary Examiner* — Chia-Wei A Chen

(74) *Attorney, Agent, or Firm* — Lerner, David, Littenberg, Krumholz & Mentlik, LLP

(57) ABSTRACT

An image pickup lens is provided that includes a substrate; resin layers formed on both respective opposite surfaces of the substrate; a lens portion formed on at least any one of the surfaces of the substrate; and a spacer formed on at least any one of the surfaces of the substrate at an area surrounding the lens portion.

15 Claims, 15 Drawing Sheets

FIG.12A   FIG.12B
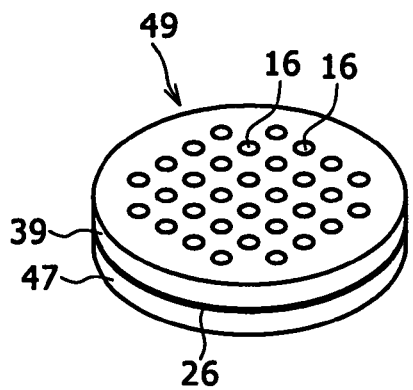 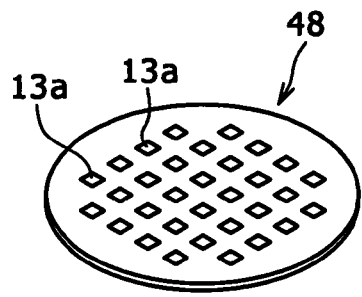
FIG.12C
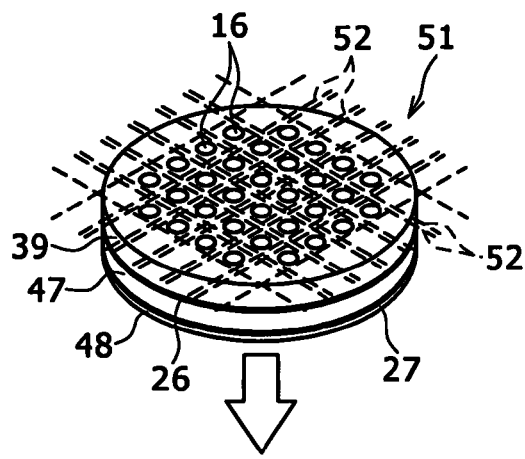
FIG.12D
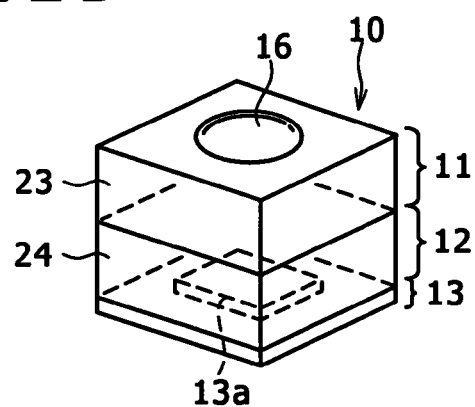

IMAGE PICKUP LENS, CAMERA MODULE USING THE SAME, IMAGE PICKUP LENS MANUFACTURING METHOD AND CAMERA MODULE MANUFACTURING METHOD

CROSS-REFERENCE TO RELATED APPLICATION

The present application claims priority from Japanese Patent Application No. JP 2009-286463 filed in the Japanese Patent Office on Dec. 17, 2009, the entire content of which is incorporated herein by reference.

BACKGROUND OF THE INVENTION

1. Field of the Invention

The present invention relates to a wafer-level image pickup lens in which resin layers are formed on both surfaces of a glass substrate and a resin layer on at least one of the surfaces is formed with a lens portion, a camera module using the image pickup lens, an image pickup lens manufacturing method and a camera module manufacturing method.

2. Description of the Related Art

Small-sized thin image pickup camera modules are mounted on small-sized information-processing devices such as mobile phones and PDAs (Personal Digital Assistants). To meet the demand of further downsizing and thinning of the small-sized information-processing devices, the camera modules of this type need downsizing and thinning. Some camera modules use wafer-level image pickup lenses in order to achieve downsizing and thinning.

The wafer-level image pickup lens is manufactured as illustrated in e.g. FIGS. 18A and 18B. In this example, an ultraviolet curable resin 105 is supplied to a circular glass substrate 101 by means of a dispenser 102. Next, while being shaped by means of a master tool 103, the ultraviolet curable resin 105 is irradiated with ultraviolet rays from a light source 104 via a glass substrate 101. In this way, a wafer-level image pickup lens 100 is manufactured.

SUMMARY OF THE INVENTION

The manufacturing method illustrated in FIGS. 18A and 18B manufactures the wafer-level image pickup lens 100 one by one by means of the master tool 103. Therefore, it is difficult to further improve production efficiency and such a method is unsuitable for quantity production. If the lens portions are formed on both the sides of the glass substrate 101, it is necessary to align the respective optical axes of the lens portions formed on the surfaces. As described above, the manufacturing method illustrated in FIGS. 18A and 18B separately forms the lens portions on the corresponding surfaces of the glass substrate 101. Therefore, steps such as the optical axis alignment and the like are complicated and cumbersome. In addition, when the lens portion is formed on one of the surfaces, the lens portion having been formed on the other surface tends to leave residual stress, which causes distortion. Thus, it is difficult to further improve optical performance.

Examples of the wafer-level image pickup lens manufacturing method include one as illustrated in FIGS. 19A to 19F. In this example, as illustrated in FIG. 19A, an ultraviolet curable resin 118 in a quantity for a large number of image pickup lenses is first supplied to a glass substrate 111 by means of a dispenser. Lens portions 113 are molded by means of a mold with ultraviolet transparency, e.g., a glass molding tool 112. Next, as illustrated in FIG. 19B, while being molded by means of the glass molding tool 112, the ultraviolet curable resin 118 on the glass substrate 111 is irradiated with ultraviolet rays from the side of the glass molding tool 112 for curing. Thereafter, as illustrated in FIG. 19C, the glass molding tool 112 is demolded. According to this procedure, as illustrated in FIG. 19D, lens portions 114 are formed also on the other surface of the glass substrate tool 111. Thereafter, as illustrated in FIG. 19E, a plurality of wafer-level wafers 115 are stacked one on another by means of spacers 116 as separate members. Then, as illustrated in FIG. 19F, the wafer-level wafers 115 are divided into individual image pickup lenses 117.

However, in the example illustrated in FIGS. 19A to 19F, the plurality of wafer-level wafers 115 are stacked one on another by means of the spacers 116 as separate members. Therefore, the fixation of the wafer-level wafers 115 becomes complicated and cumbersome because of the steps such as optical axis alignment and the like. In addition, when the lens portion 113 is formed on one of the surfaces, the lens portion 113 having been formed on the other surface tends to leave residual stress, which causes distortion. Thus, it is difficult to further improve optical performance.

Further, Japanese Patent Laid-Open Nos. 2009-251367 and 2009-251368 (hereinafter referred to as Patent Documents 1 and 2) describe wafer-level image pickup lenses. Also in Patent Documents 1 and 2, lens portions formed on the surfaces of a glass substrate are separately molded. Therefore, also in Patent Documents 1 and 2, when the lens portion is formed on one of the surfaces, the lens portion having been formed on the other surface tends to leave residual stress, which causes distortion. Thus, it is difficult to further improve optical performance. In addition, in the examples of Patent Documents 1 and 2, the stacking of the image pickup lenses uses spacers as separate members; therefore, the steps such as optical axis alignment become complicated and cumbersome.

Further, also in any of the examples described above, the attachment of image pickup devices is performed after lens systems have been assembled. Therefore, the lens systems having individually divided need the step of attachment of the image pickup devices. Thus, it is difficult to further improve production efficiency.

It is desirable to provide an image pickup lens and camera module that can improve production efficiency and optical performance also when the image pickup lenses are stacked, an image pickup lens manufacturing method and a camera module manufacturing method.

According to an embodiment of the present invention, there is provided an image pickup lens that includes: a substrate; resin layers formed on both respective opposite surfaces of the substrate; a lens portion formed on at least any one of the surfaces of the substrate; and a spacer formed on at least any one of the surfaces of the substrate at an area surrounding the lens portion.

According to another embodiment of the present invention, there is provided a camera module that includes: an image pickup lens including a substrate, resin layers formed on both respective opposite surfaces of the substrate, a lens portion formed on at least any one of the surfaces of the substrate, and a spacer formed on at least any one of the surfaces of the substrate at an area surrounding the lens portion; and an image pickup substrate formed with an image pickup device. A plurality of the image pickup lenses are integrally stacked one on another with optical axes thereof aligned with each other by butting the spacer of one of the image pickup lenses against the periphery of the lens portion of the other image pickup lens, and the image pickup lens and the image pickup substrate are integrally stacked one on another with optical axes thereof aligned with each other by butting the spacer of the image pickup lens against the image pickup substrate.

According to another embodiment of the present invention, there is provided an image pickup lens manufacturing method that includes the steps of: setting a substrate in a mold, then injecting a resin material into the mold for curing, and thereafter demolding the mold, for simultaneously forming resin layers on both the respective opposite surfaces of the substrate, and simultaneously forming a lens portion on at least any one of the surfaces of the substrate and a spacer at an area surrounding the lens portion.

According to another embodiment of the present invention, there is provided a camera module manufacturing method that includes the steps of: setting a substrate in a mold, then injecting a resin material into the mold for curing, and thereafter demolding the mold, for simultaneously forming resin layers on both the respective opposite surfaces of the substrate, whereby a plurality of image pickup lens wafers are formed in which a large number of image pickup lenses are formed, the image pickup lens being formed with a lens portion on at least any one of substrates of the substrate and with a spacer formed in an area surrounding the lens portion; butting the spacer of one of the image pickup lens wafers against the periphery of the lens portion of the other image pickup lens wafer to integrally stack the plurality of image pickup lens wafers with optical axes thereof aligned with each other; butting the spacer of the image pickup lens wafer against the image pickup substrate wafer formed with a large number of image pickup devices to integrally stack the lens portions and the corresponding image pickup devices with optical axes thereof aligned with each other; and dicing, into individual pieces, the plurality of image pickup lens wafers and the image pickup substrate wafer stacked one on another, for manufacturing individual camera modules.

According to the present invention, the spacer is formed integrally with the lens portion on any one of the surfaces of the substrate; therefore, even when the image pickup lenses are stacked one on another, it is not necessary to use a spacer as a separate member. In addition, even if the lens portions are provided on both the respective surfaces of the substrate, the lens portions are simultaneously formed on both the respective opposite surfaces; therefore, it is possible to eliminate the step of optical axis adjustment or the like between the lens portions holding the substrate therebetween. Thus, the present invention can improve production efficiency while improving optical performance.

BRIEF DESCRIPTION OF THE DRAWINGS

FIGS. 12A to 12D are manufacturing process views, FIG. 12A illustrating a lens unit, FIG. 12B illustrating an image pickup substrate wafer, FIG. 12C illustrating a lens unit, FIG. 12D illustrating a diced camera module.

DETAILED DESCRIPTION OF THE PREFERRED EMBODIMENTS

A description will hereinafter be described of camera modules according to embodiments of the present invention with reference to the drawings. Incidentally, the embodiment of the invention is below described in the following order.

Figure 1:
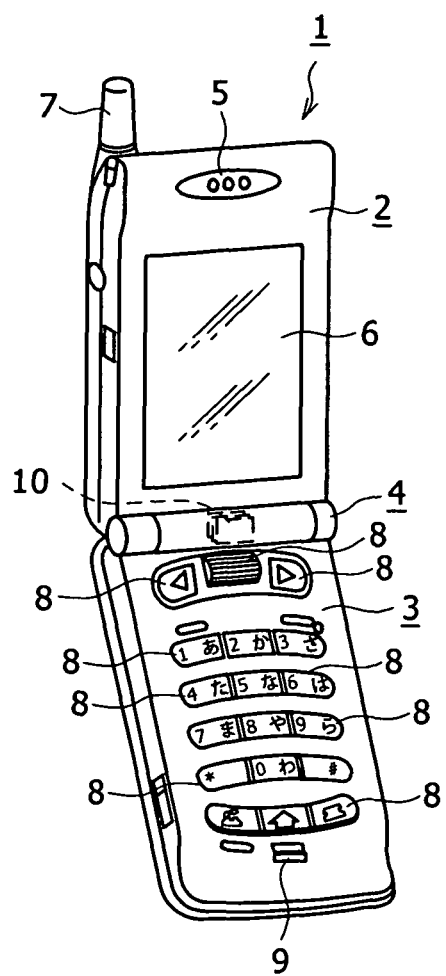
FIG. 1 is a perspective view of a mobile phone.

(1) A description of a mobile phone
(2) A description of a camera module
(3) A description of a camera module manufacturing method
(4) Modifications
  (4-1) A modification of a glass lens substrate
  (4-2) A modification of an image pickup lens
  (4-3) A modification of a spacer
  (4-4) Other modifications (1) A Description of a Mobile Phone Referring to FIG. 1, a mobile phone 1 on which a cameral module according to an embodiment of the present invention is mounted is such that a first casing 2 and a second casing 3 are coupled to each other in a foldable manner via a hinge portion 4. The first casing 2 is provided with a speaker 5, a display portion 6 and an antenna 7. The antenna 7 is telescopic. The second casing 3 is provided with various operating portions 8 including push buttons and a rotary dial and with a microphone 9. A camera module 10 is assembled in the hinge portion 4. A predetermined push button of the operating portions 8 functions as an operating portion 8 to pick up images. This operating portion 8 is operatively pushed to operate the camera module 10, thereby allowing for picking up images. In short, this mobile phone 1 is an electronic device or information-processing device functioning as also an image pickup device.

Incidentally, the camera module 10 may be located in the first casing 2 or second casing 3 as well as in the hinge portion 4. A plurality of the camera modules 10 may be mounted on the single mobile phone 1.

(2) A Description of a Camera Module

Figure 2:
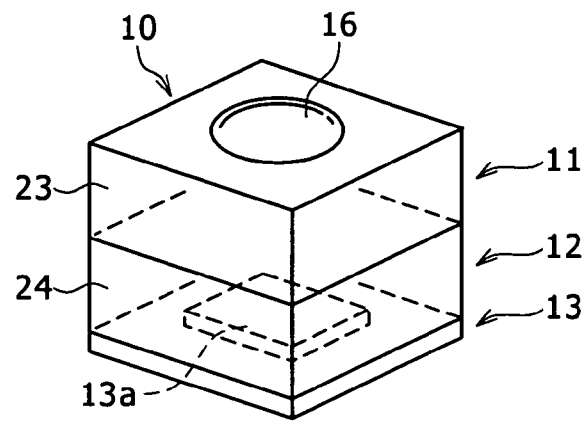
FIG. 2 is a perspective view of a camera module according to an embodiment of the present invention.
Figure 3:
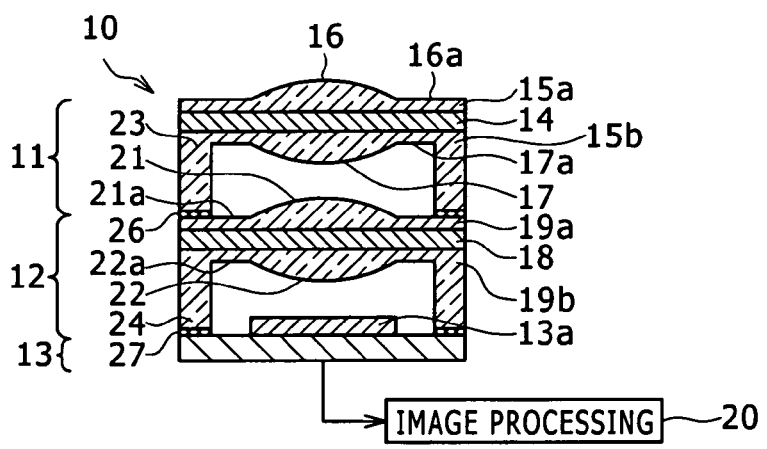
FIG. 3 is a cross-sectional view of the camera module.

Referring to FIGS. 2 and 3, the camera module 10 embodying the present invention is configured such that a first image pickup lens 11, a second image pickup lens 12 and an image pickup substrate 13 provided with an image pickup device 13a are stacked one on another.

Figure 4:
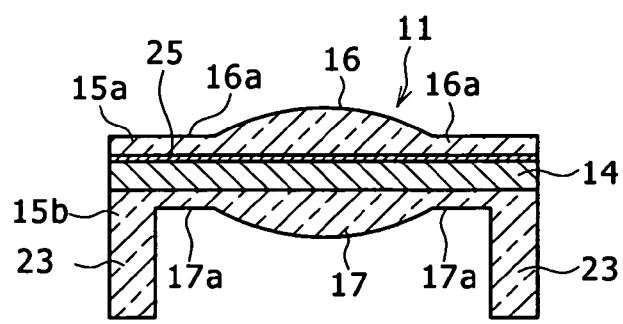
FIG. 4 is a cross-sectional view of a first image pickup lens according to an embodiment of the present invention.

Referring to FIGS. 2 to 4, the first image pickup lens 11 is such that a first resin layer 15a is formed on one of surfaces of a first glass lens substrate 14 and a second resin layer 15b is formed on the other surface. The first glass lens substrate 14 is made of e.g. a parallel flat plate and has optical transparency. The first resin layer 15a is formed with a first lens portion 16 formed e.g. in a convex shape and the second resin layer 15b is formed with a second lens portion 17 formed e.g. in a convex shape. The periphery of the first lens portion 16 is formed as a flat portion 16a and that of the second lens portion 17 is formed as a flat portion 17a. In short, the first glass lens substrate 14 is formed with the first and second resin layers 15a, 15b on both the surfaces thereof.

The second image pickup lens 12 is such that a third resin layer 19a is formed on one of surfaces of a second glass lens substrate 18 and a fourth resin layer 19b is formed on the other surface. The second glass lens substrate 18 is made of e.g. a parallel flat plate and has optical transparency. The third resin layer 19a is formed with a third lens portion formed e.g. in a convex shape and the fourth resin layer 19b is formed with a fourth lens portion 22 formed e.g. in a convex shape. The periphery of the third lens portion 21 is formed as a flat portion 21a and that of the fourth lens portion 22 is formed as a flat portion 22a. In short, the second glass lens substrate 18 is formed with the third and fourth resin layers 19a, 19b on both the surfaces thereof.

Incidentally, the first through fourth lens portions 16, 17, 21, 22 may each be formed not only in the convex shape but in a concave shape. The camera module 10 may fully be formed to have flat portions each formed of a resin layer without the first through fourth lens portions 16, 17, 21, 22 in accordance with the use application thereof. The number of stages of the image pickup lens is not limited to two as described above but may be one or three or more.

On the first glass lens substrate 14, the second resin layer 15b is formed with a first spacer 23 on the periphery of the second lens portion 17. In addition, on the second glass lens substrate 18, the fourth resin layer 19b is formed with a second spacer 24 on the periphery of the fourth lens portion 22. The first spacer 23, of the second resin layer 15b, integral with the second lens portion 17 via the flat portion 17a on the periphery of the second lens portion is formed to project from the other surface of the first glass lens substrate 14 to define a given interval between the third lens portion 21 and the second lens portion 17. In addition, the second spacer 24, of the fourth resin layer 19b, integral with the fourth lens portion 22 via the flat portion 22a on the periphery of the fourth lens portion 22 is formed to project from the other surface of the second glass lens substrate 18 to define a given interval between the image pickup substrate 13 and the fourth resin layer 19b. The first spacer 23 is formed to surround the first glass lens substrate shaped in a general rectangle. The second spacer 24 is formed to surround the second glass lens substrate 18 shaped in a general rectangle. In this way, a light-shield space is defined between the second lens portion 17 and the third lens portion 21 and between the fourth lens portion 22 and the image pickup device 13a to prevent the entrance of outsight light into an optical path.

The first image pickup lens 11 is formed with an infrared reflective film 25 between the first glass lens substrate 14 and the first resin layer 15a. The infrared reflective film 25 is formed by depositing an infrared reflective material on one of the surfaces of the first glass lens substrate 14 by sputtering, deposition or the like. Incidentally, the infrared reflective film 25 may not be provided. The first image pickup lens 11 can omit the infrared reflective film 25 by dispersing an infrared absorption agent into the resin material of the first resin layer 15a.

The image pickup substrate 13 is a semiconductor substrate such as a silicon substrate or the like and formed with the image pickup device 13a. Incidentally, the image pickup substrate 13 may be an organic resin substrate made of a glass epoxy resin, polyimide or the like.

Next, the first image pickup lens 11 is bonded to the second image pickup lens 12 at a portion surrounding the third lens portion 21 of the second image pickup lens 12 with a first adhesive 26 coated on the end face of the first spacer 23. The second image pickup lens 12 is bonded to the image pickup substrate 13 at a portion surrounding the image pickup device 13a of the image pickup substrate 13 with a second adhesive 27 coated on the end face of the second spacer 24.

Incidentally, the first spacer 23 is here bonded to the third resin layer 19a at a portion surrounding the third lens portion 21; however, the first spacer 23 may directly be bonded to the second glass lens substrate 18 not formed with the third resin layer as described later.

In the camera module 10 configured as described above, imaging light having passed through the first through fourth lens portions 16, 17, 21 and 22 is received by the image pickup device 13a. Incidentally, in the camera module 10, the first image pickup lens 11 and the second image pickup lens 12 are stationary, that is, are not movable unlike a focus lens or a zoom lens. Therefore, an image-processing section 20 electrically connected to the image pickup device 13a performs image processing, i.e., focusing processing and/or zooming processing, on the image date obtained by the image pickup device 13a, thereby providing image data desired by a user.

The camera module 10 configured as above is such that the first glass lens substrate 14 is formed with the first and second resin layers 15a, 15b on both the sides thereof and the first and second spacers 23 and 24 are formed integrally with the first and second lens portions 16 and 17, respectively. As described later, the first and second lens portions 16, 17 and the first and second spacers 23, 24 are simultaneously formed by setting the first and second glass lens substrates 14, 18 in a molding device 30, pouring a resin material such as a thermosetting resin into the molding device and curing it. This eliminates adjusting work such as optical axis alignment for the first and second lens portions 16, 17, which can improve production efficiency. Also the first spacer 23 is formed simultaneously with the first and second lens portions 16, 17; therefore, assembly becomes more easily than in the case where the spacer is a separate member as in a traditional way. The first and second lens portions 16, 17 are simultaneously formed by injection molding; therefore, it is possible to prevent the occurrence of distortion at the first lens portion when the second lens portion is formed after the formation of the first lens portion as in a traditional way. Thus, optical characteristics can be enhanced. Incidentally, such an effect applies to the second image pickup lens 12.

(3) A Description of a Camera Module Manufacturing Method

A description is next given of a method of manufacturing the first image pickup lens 11. Incidentally, the detailed description of a method of manufacturing the second image pickup lens 12 is omitted because the method of manufacturing the second image pickup lens 12 is the same as the method of manufacturing the first image pickup lens 11.

Figure 5:
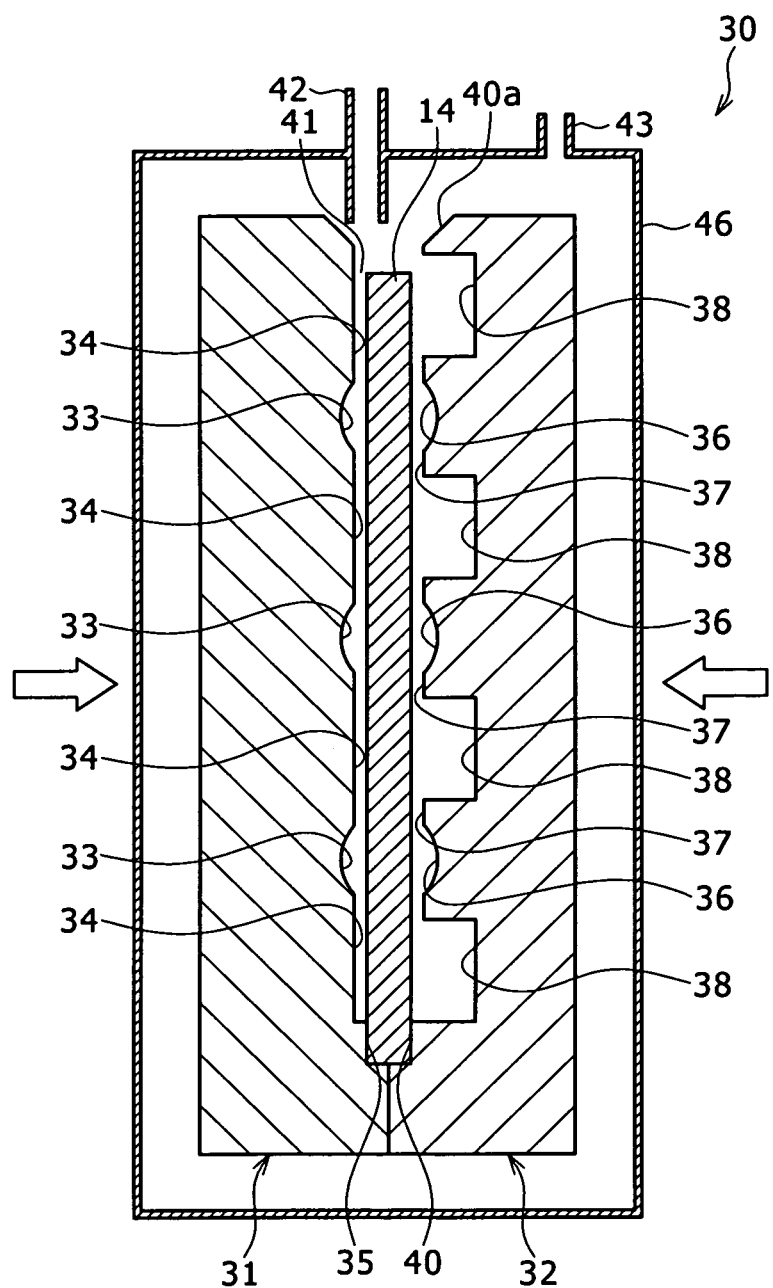
FIG. 5 is a cross-sectional view illustrating a state where a first glass lens substrate is set inside a molding device used to mold image pickup lenses.

Referring to FIG. 5, the molding device 30 used to manufacture the first image pickup lens 11 includes a first mold 31 used to form a first lens portion 16 side and a second mold 32 used to form a second lens portion 17 side. The molding device 30 is installed e.g. in a clean room 46 so that foreign matter is prevented from entering the first image pickup lens 11, making it possible to manufacture the first image pickup lens 11 with a high degree of optical accuracy.

In the first mold 31, first lens portion forming portions 33 forming the first lens portions 16 and flat portion forming portions 34 forming flat portions 16a on the peripheries of the first lens portions 16 are continuously formed. The first mold 31 is formed at an end with a substrate support portion 35 supporting the first glass lens substrate 14.

In the second mold 32, second lens portion forming portions 36 forming the second lens portions 17, flat portion forming portions 37 forming the flat portions 17a surrounding the second lens portions 17, and the first spacer forming portions 38 forming the first spacers 23 are continuously formed. Further, the second mold 32 is formed at an end with a second substrate support portion 40, which supports the first glass lens substrate 14 in cooperation with the first substrate support portion 35. The first substrate support portion 35 and the second substrate support portion 40 serve as a substrate holding portion to hold the first glass lens substrate 14 with the first mold 31 and the second mold 32 clamped together.

Figure 6:
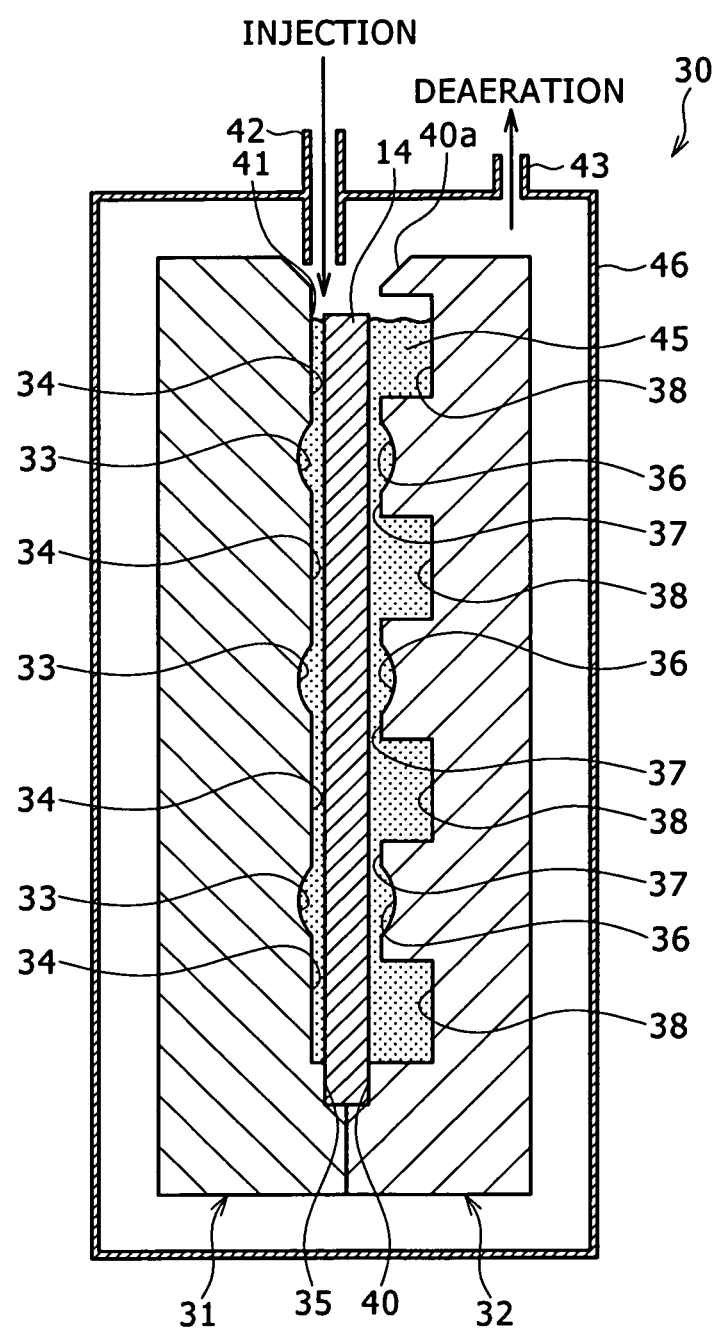
FIG. 6 is a cross-sectional view illustrating a state where a first mold and a second mold are clamped together.

Referring to FIG. 6, the first mold 31 and the second mold 32 are clamped together to define a cavity 41, which is adapted to form a first image pickup lens wafer 39 formed with a large number of the first image pickup lenses 11 on a surface.

Similarly to the second image pickup lens 12, the first image pickup lens 11 uses a thermosetting resin. Therefore, similarly to the common mold, the first and second molds 31, 32 can be formed with the forming surface of the cavity 41 by cutting metal. Examples of the thermosetting resin used herein include acrylic, epoxy, and silicon. The thermosetting resin may be of a single-liquid type or a two-liquid type (epoxy or silicon) of a base resin and a setting agent. An example of the thermosetting resin of the two-liquid type includes Toray Corning OE-6636.

Incidentally, if an ultraviolet curable resin is used as the resin material, the first mold 31 and the second mold 32 need to have optical transparency; therefore, they are made of e.g. glass or the like.

In the molding device 30 configured as above, the first glass lens substrate 14 is mounted on any one of the respective substrate support portions 35, 40 of the first and second molds 31, 32. Thereafter, the first and second molds 32, 33 are brought close to each other and clamped together. Incidentally, in the embodiment, the first glass lens substrate 14 is first mounted on the second substrate support portion 40 of the second mold 33.

After the mold clamping is performed to define the cavity 41 inside the first and second molds 31, 32, as shown in FIG. 6, a molten thermosetting resin 45 is injected from a nozzle 42 into the cavity 41. At the same time, the clean room 46 is deaerated from a deaerating port 43 connected to a vacuum pump. In other words, since the molten thermosetting resin 45 may contain bubbles because of low viscosity, defoaming is performed via an opening portion 40a opened in the upper portion of the molding device.

Figure 7:
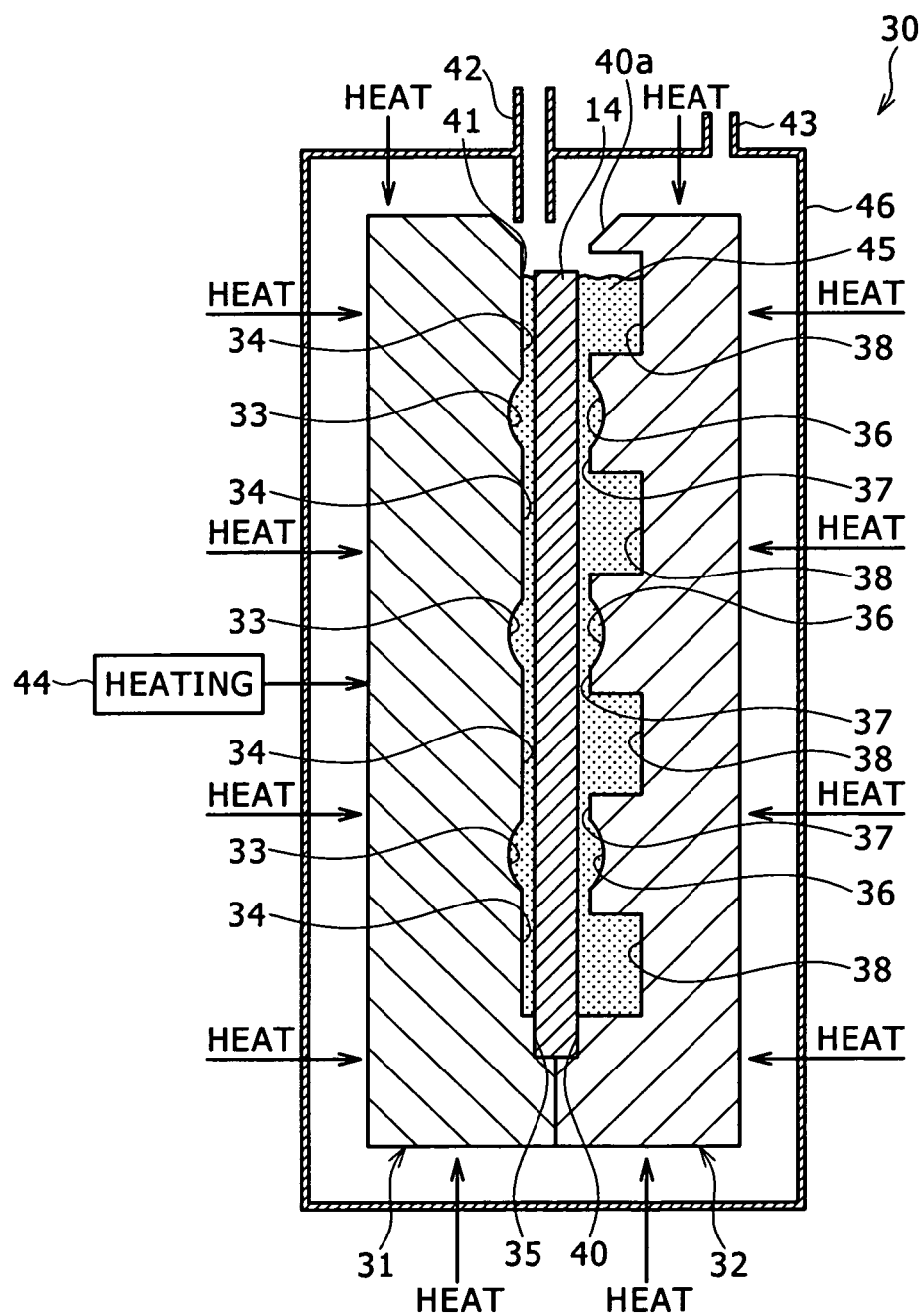
FIG. 7 is a cross-sectional view illustrating a state where the first and second molds are clamped together and subjected to a heat treatment.

Referring to FIG. 7, the first mold 31 and/or the second mold 32 are next heated by a heating device 44 to perform thermosetting processing on the thermosetting resin 45.

Figure 8:
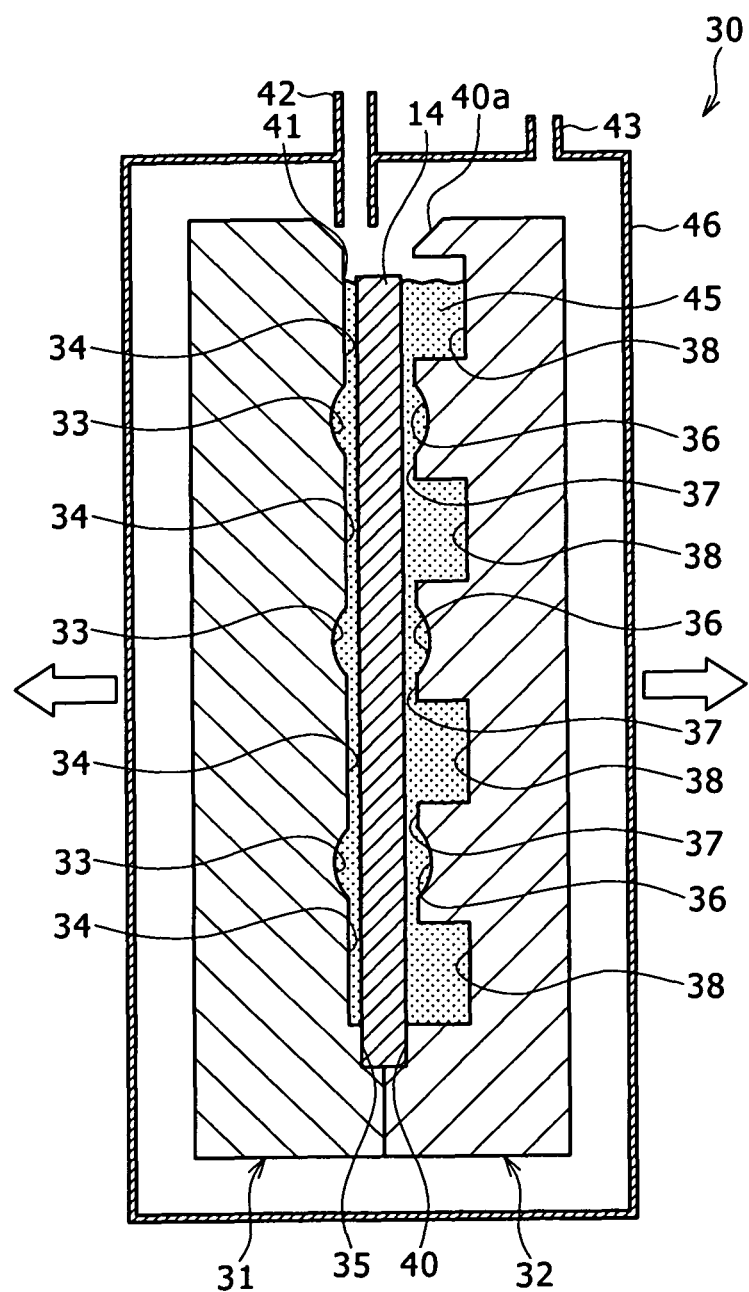
FIG. 8 is a cross-sectional view illustrating a state where the first and second molds are opened from each other.
Figure 9:
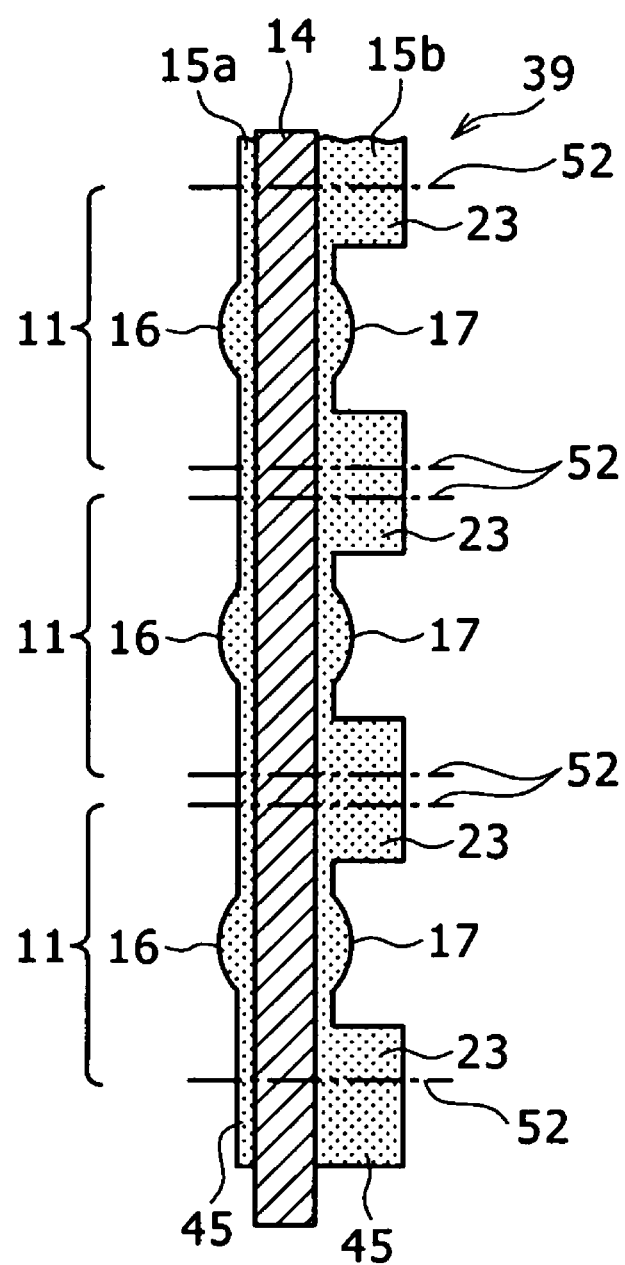
FIG. 9 is a cross-sectional view of a first image pickup lens wafer molded.
Figure 10:
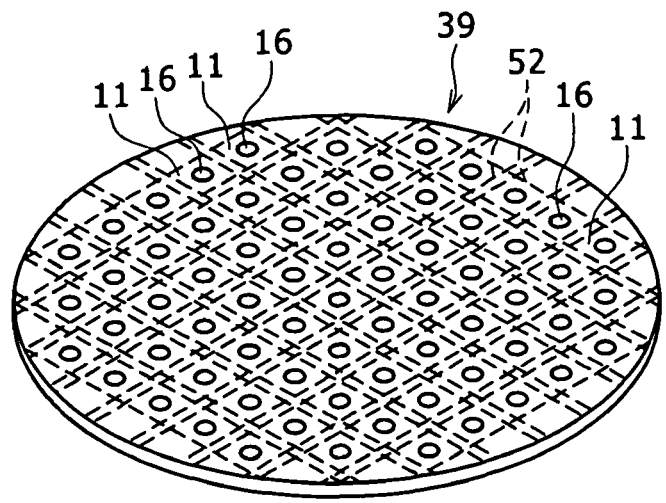
FIG. 10 is a perspective view of the first image pickup lens wafer molded.

After the thermosetting resin 45 in the cavity 41 is set, the heating is stopped. Referring to FIG. 8, the first mold 31 and the second mold 32 are next opened from each other and the first image pickup lens wafer 39 is taken out from any one of the first mold 31 and the second mold 32 by e.g. an ejecting mechanism. In this way, as illustrated in FIGS. 9 and 10, the first image pickup lens wafer 39 formed with a large number of the first image pickup lenses 11 is molded. In short, the first image pickup lens wafer 39 is molded by insert molding.

Incidentally, also the second image pickup lens wafer 47 formed with a large number of the second image pickup lenses 12 is molded similarly to the first image pickup lens wafer 39 described as above.

Figure 11:
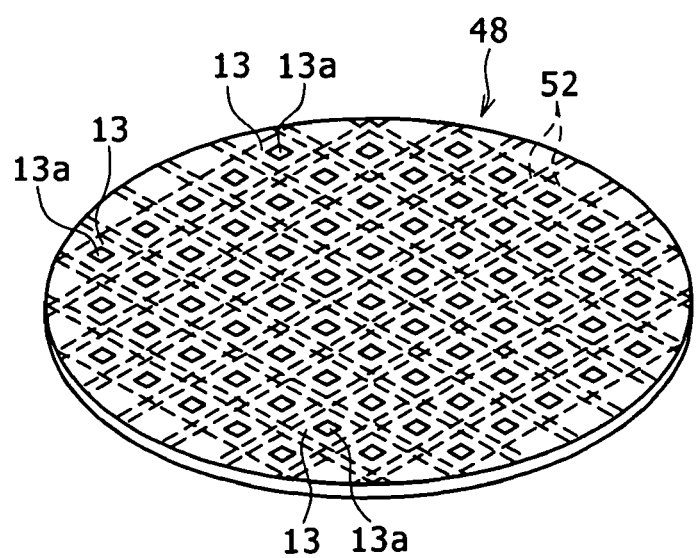
FIG. 11 is a perspective view of an image pickup substrate wafer.

Referring to FIG. 11, although details are omitted, also the image pickup substrates 13 formed with a large number of the image pickup devices 13a are in the state of an image pickup substrate wafer 48 formed with a large number of the image pickup substrates 13 before being divided into individual pieces. The image pickup substrate wafer 48 is formed with a large number of the image pickup devices 13a on the front surface of a silicon wafer or the like through a common semiconductor manufacturing process and the like.

The first image pickup lens wafer 39, the second image pickup lens wafer 47 and the image pickup substrate wafer 48 are formed e.g. in a circle to have the same size. Each of the first image pickup lenses 11, each of the second image pickup lenses 12 and each of the image pickup substrates 13 are formed so as to be stacked one on another.

The first image pickup lens wafer 39 and second image pickup lens wafer 47 thus molded are stacked as illustrated in FIG. 12A. Specifically, as illustrated in FIGS. 2 and 3, the first image pickup lens 11 is bonded to the periphery of the third lens portion 21 of the second image pickup lens 12 with the first adhesive 26 coated on the end face of the first spacer 23. In this way, a lens unit 49 is manufactured.

Referring to FIG. 12B, in another step, the image pickup substrate wafer 48 is formed with a large number of the image pickup devices 13a on the front surface of a silicon wafer through a common semiconductor manufacturing process and the like.

Referring to FIG. 12C, in the second image pickup lens wafer 47 and the image pickup substrate wafer 48, the second image pickup lens 12 is bonded to the periphery of the image pickup device 13a of the image pickup substrate 13 with the second adhesive 27 coated on the end face of the second spacer 24. In this way, a camera module wafer 51 formed with a large number of the camera modules 10 is manufactured.

Figure 13:
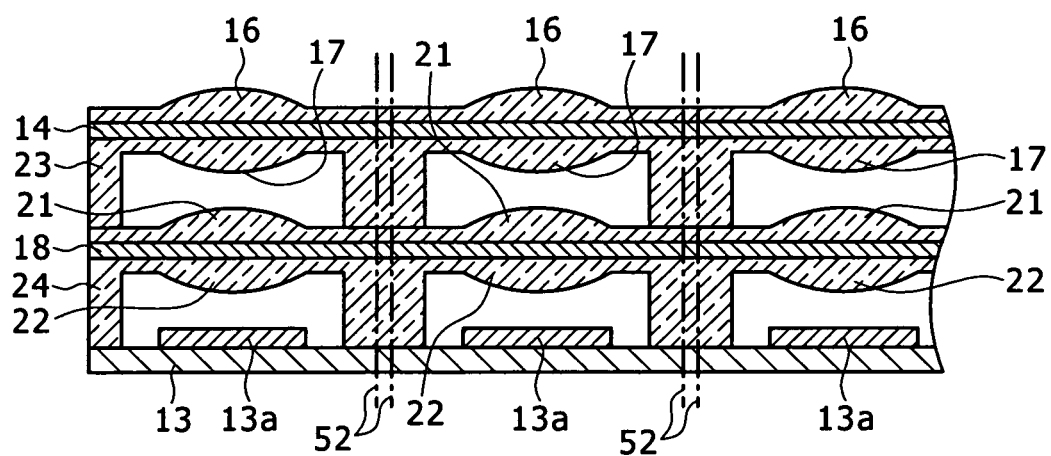
FIG. 13 is a cross-sectional view of the lens unit.

Referring to FIG. 13, thereafter, the camera module wafer 51 is diced into individual pieces along dicing lines 52 formed on the first and second spacers 23, 24. Thus, the camera module 10 as illustrated in FIGS. 2, 3 and 12D is completed.

As illustrated in FIG. 9, in the method of manufacturing the camera module 10 described above, the first lens portions 16 and second lens portions 17 of the first image pickup lens wafer 39 are simultaneously formed. Therefore, a step such as optical axis adjustment or the like between the first lens portion 16 and the second lens portion is not necessary. The third lens portions 21 and fourth lens portions 22 of the second image pickup lens wafer 47 are simultaneously formed. Therefore, a step such as optical axis adjustment or the like between the third lens portion 21 and the fourth lens portion 22 are not necessary. Thus, the step of manufacturing the first image pickup lens wafer 39 and the second image pickup lens wafer 47 is simplified to achieve an improvement in production efficiency. The first lens portion and the second lens portion 17 are simultaneously formed and the third lens portion 21 and the fourth lens portion 22 are simultaneously formed. Therefore, it is possible to prevent a previously formed lens portion from causing distortion, unlike the case where lenses formed oppositely to each other with each of the glass lens substrates 14, 18 put therebetween are formed one by one. The first spacer 23 is formed integrally with the first image pickup lens wafer 39 and the second spacer 24 is formed integrally with the second image pickup lens wafer 47. Also this point can eliminate the step of attachment of the lens and a spacer as another element, which can improve an improvement in production efficiency.

The method of manufacturing the camera module 10 requires only the step of the optical axis adjustment among the first image pickup lens wafer 39, the second image pickup lens wafer 47 and the image pickup substrate wafer 48. This can improve an improvement in production efficiency.

Referring to FIGS. 12C and 13, for a dicing step, the method of manufacturing the camera module 10 as described above involves only dicing for the camera module wafer 51. Also this point can improve production efficiency.

(4) Modifications (4-1) A Modification of a Glass Lens Substrate

The above embodiments describe the case where the first and second image pickup lenses 11 and 12 use the first and second glass lens substrates 14 and 18, respectively, each made as a parallel flat plate. However, in the present invention, the first and second glass lens substrates 14, 18 may each use a metal hole substrate 61 as a lens substrate. This metal hole substrate 61 is formed with a large number of generally rectangular opening portions 62 corresponding to respective lens portions like punching metal. As illustrated in FIGS. 5 to 8, the metal hole substrate 61 is set in the molding device 30. Specifically, the metal hole substrate 61 is held by the first substrate support portion 35 and the second substrate support portion 40. The first and second image pickup lens wafers 39, 47 are molded by the thermosetting resin 45 injected into the cavity 41 and subjected to thermosetting.

Figure 14A:
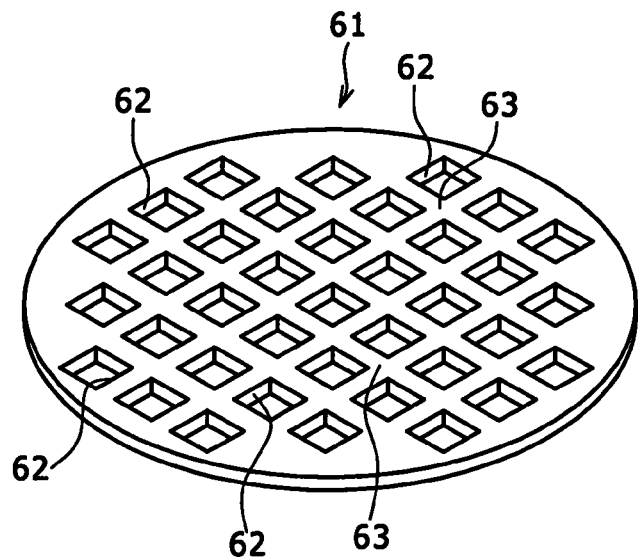
FIG. 14A is a perspective view of a metal hole substrate and FIG. 14B is a perspective view illustrating a state where lens portions are formed on the metal hole substrate.
Figure 14B:
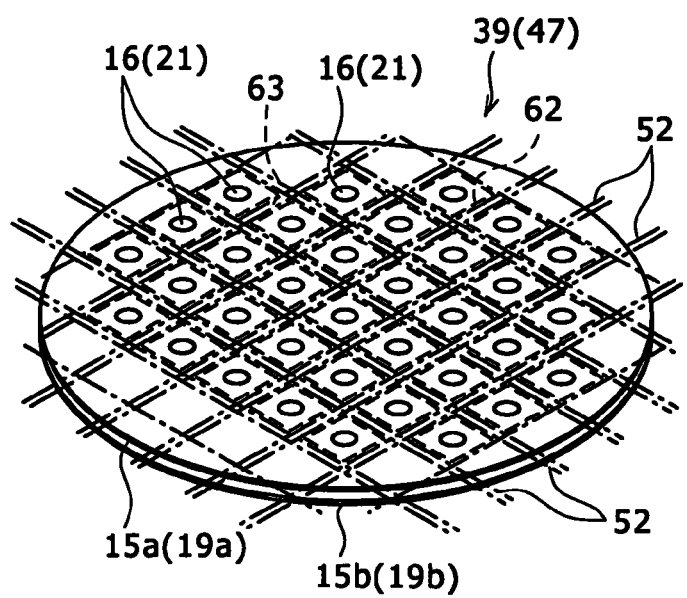

Specifically, as illustrated in FIG. 14B, first lens portions 16 and second lens portions 17 made of first and second resin layers 15a and 15b, respectively, are formed in the corresponding opening portions 62. In this way, a first image pickup lens wafer 39 is manufactured. Similarly, also a second image pickup lens wafer 47 is manufactured.

As described above, the first and second image pickup lens wafers 39, 47 are insert-molded. As described with FIGS. 12A to 12D, etc., the first and second image pickup lens wafers 39, 47 molded as above are stacked one on another. Specifically, as illustrated in FIGS. 2 and 3, the first image pickup lens wafer 11 is bonded to the periphery of the third lens portion 21 of the second image pickup lens 12 with the first adhesive 26 coated on the end face of the first spacer 23. In this way, the lens unit 49 is manufactured.

Next, the second image pickup lens wafer 47 and the image pickup substrate wafer 48 are such that the second image pickup lens 12 is bonded to the periphery of the image pickup device 13a of the image pickup substrate 13 with the second adhesive 27 coated on the end face of the second spacer 24. In this way, the camera module wafer 51 formed with a large number of the camera modules 10 is manufactured. Thereafter, as illustrated in FIG. 13, the camera module wafer 51 is diced along dicing lines 52 on the first and second spacers 23, 24. Thus, the camera module 10 illustrated in FIGS. 2, 3 and 12D is completed.

In other words, if the metal hole substrate 61 is used, the dicing is performed by use of the dicing lines formed on metal frame portions defining the opening portions 62. Therefore, the frame portion 63 is partially left on the first and second spacers 23, 24. Unlike the embodiments described above, the first glass lens substrate 14 is not interposed between the first lens portion 11 and the second lens portion 12 and the second glass lens substrate 18 is not interposed between the third lens portion 21 and the fourth lens portion 22 but only resin is present.

Incidentally, if the metal hole substrate 61 is used, first and second spacers 66, 67 may be provided on the inside of the opening 62 in addition to the provision of the first and second lens portions 11, 12 and the third and fourth lens portions 21, 22. In this case, the complete image pickup lenses 11, 12 can be lenses made of only resin, not containing the glass substrate by locating the dicing lines inside the opening portion and cutting away the frame portions 63.

(4-2) A Modification of an Image Pickup Lens

Figure 15A:
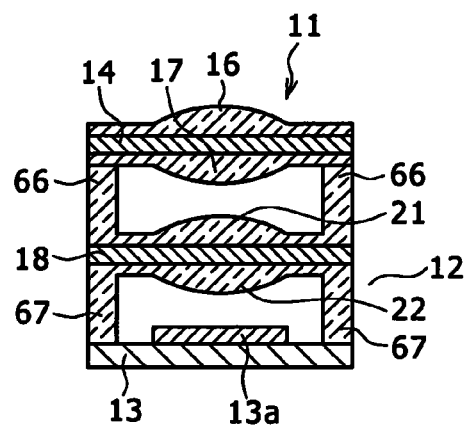
FIGS. 15A to 15C are cross-sectional views illustrating an example where spacer are provided on both sides of an image pickup lens, FIG. 15A illustrating a camera module, FIG. 15B illustrating a first image pickup lens not provided with a spacer, FIG. 15C illustrating a second image pickup lens provided with spacers on both surfaces.
Figure 15B:
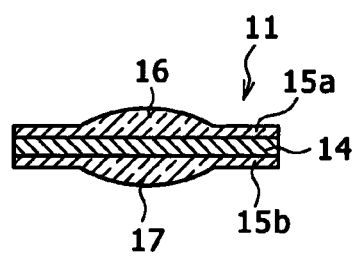
Figure 15C:
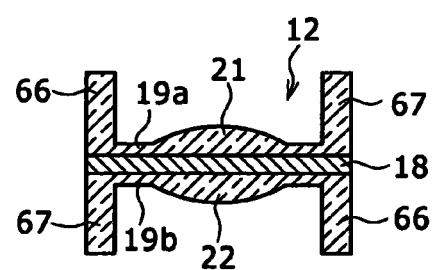

As illustrated in FIG. 3, the above embodiments describe the case where the first and second spacers 2, 24 are formed on the other respective surfaces of the first and second glass lens substrates 14, 18. However, in the present invention, a spacer may be formed on only one of the image pickup lenses. Specifically, as illustrated in FIGS. 15A to 15C, the first image pickup lens 11 is not provided with a spacer but the second image pickup lens 12 is provided with spacers 66, 67 on both the surfaces thereof. In this modification, the spacer 66 corresponds to the first spacer 23 illustrated in FIG. 3 and the spacer 67 corresponds to the second spacer 24. Also such a configuration can produce the same effect as that of the camera module 10 described above.

(4-3) A Modification of a Spacer

Figure 16:
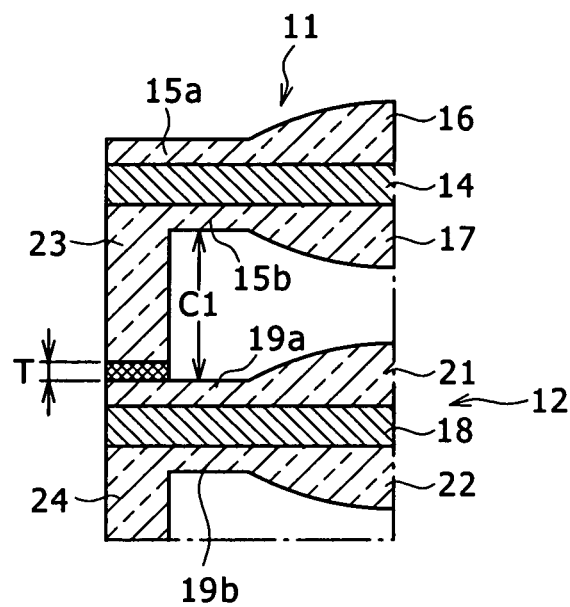
FIG. 16 is a cross-sectional view of a joint portion between a first spacer of a first image pickup lens and a third resin layer of a second image pickup lens.

As illustrated in FIG. 16, in the above embodiments, the first spacer 23 of the first image pickup lens 11 and the third resin layer 19a of the second image pickup lens 12 are secured by use of the first adhesive 26. Therefore, the front surface of the third resin layer 19a of the second image pickup lens 12 serves as a reference surface to determine a clearance between the second lens portion 17 and the third lens portion 21. However, the third resin layer 19a serving as the reference surface is made of resin; therefore, its thickness is unstable. In other words, it is difficult for the resin layer to control the thickness with a high degree of accuracy. Since the first adhesive 26 is interposed between the end face of the first spacer 23 and the third resin layer 19a, the clearance C1 between the second lens portion 17 and the third lens portion 21 is changed also depending on the thickness of the first adhesive 26.

Figure 17:
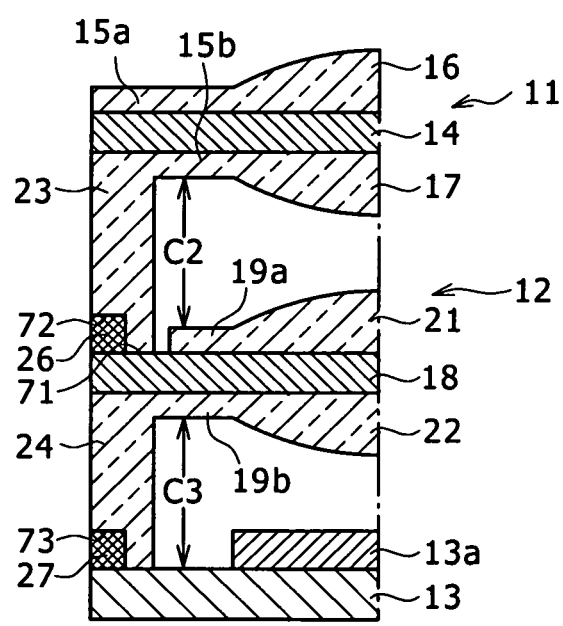
FIG. 17 is a cross-sectional view illustrating an example where a spacer is directly bonded to a glass lens substrate and an adhesive is filled in a notched portion at an outer circumferential portion of the spacer for fixation.
Figure 18A:
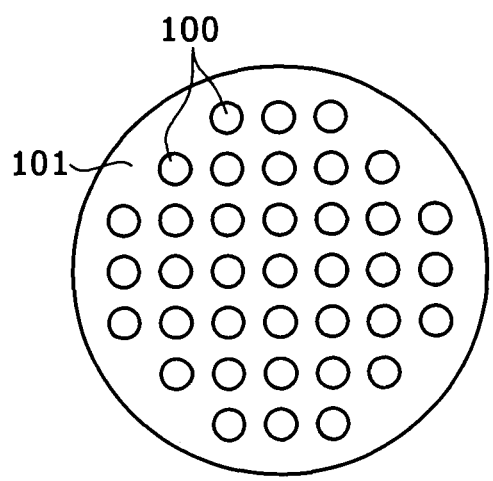
FIGS. 18A and 18B are top and side views, respectively, illustrating a traditional wafer-level manufacturing method.
Figure 18B:
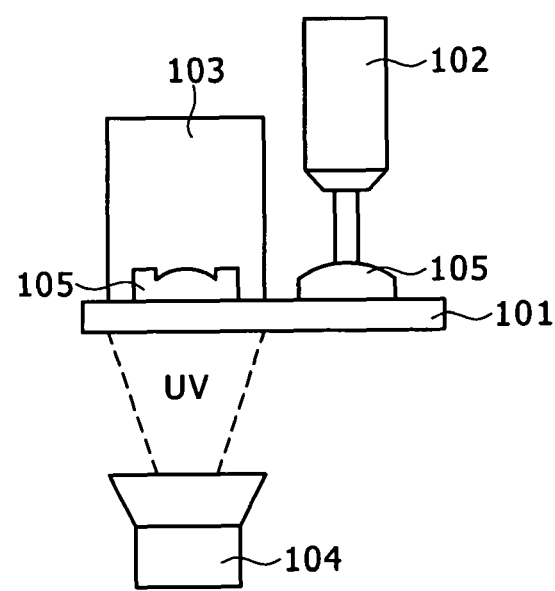
Figure 19A:
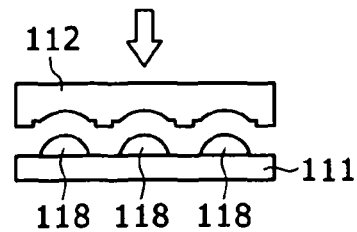
FIGS. 19A to 19F illustrate another traditional wafer-level manufacturing method, FIG. 19A illustrating a resin supply step, FIG. 19B illustrating a molding-curing step, FIG. 19C illustrating a demolding step, FIG. 19D illustrating a molding step for a lens portion on the other surface of a glass substrate, FIG. 19E illustrating an image pickup lens stacking step, FIG. 19F illustrating a dicing step.
Figure 19B:
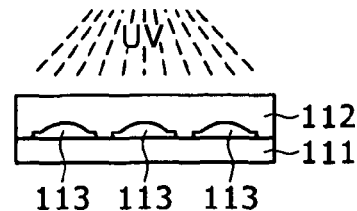
Figure 19C:
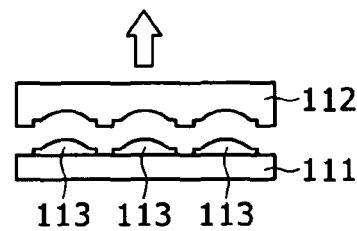
Figure 19D:
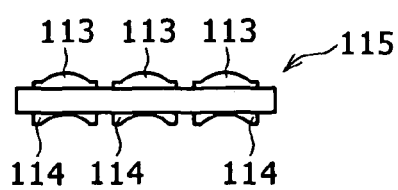
Figure 19E:
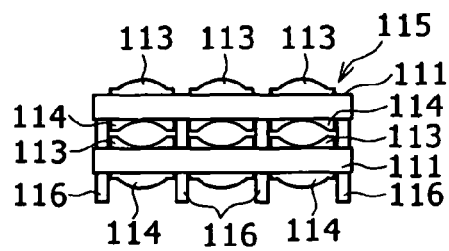
Figure 19F:
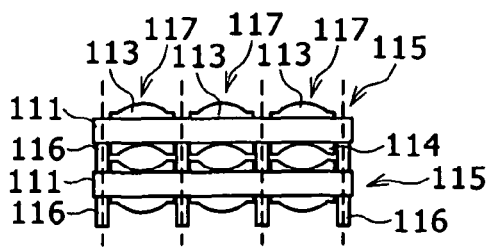

Consequently, as illustrated in FIG. 17, the second image pickup lens 12 is designed not to be provided with the third resin layer 19a at a portion against which the end face of the first spacer 23 butts. In this way, the second image pickup lens 12 is provided with an exposed portion 71 where the second glass lens substrate 18 with high rigidity and high accuracy in thickness is exposed. In addition, the end face of the first spacer 23 is butted against the exposed portion 71. Thus, a clearance C2 between the second lens portion 17 and the third lens portion 21 is high accurate.

In this case, as illustrated in FIG. 17, the first spacer 23 is formed with a notched portion 72 on the outer circumferential portion. The first adhesive 26 is filled into the notched portion 72. In this way, the first image pickup lens 11 can allow the second image pickup lens 12 to be stacked thereon with a high degree of accuracy. In addition, while butting against the second glass lens substrate 18, the second spacer 23 can be joined to the second glass lens substrate 18.

Incidentally, as illustrated in FIG. 17, the same notched portion 73 may be provided at the end face of the second spacer 24 of the second image pickup lens 12. Also in this way, the second adhesive 27 is not interposed between the end face of the second spacer 24 and the image pickup substrate 13. Thus, it is possible to prevent the thickness of the second adhesive 27 from changing a clearance C3 between the fourth lens portion 22 and the image pickup device 13a.

(4-4) Another Modification above embodiments describe the case where the camera module 10 is attached to the mobile phone 1. However, the camera module 10 of the present invention can be mounted on various electronic devices small-sized and suitable for portables.

It should be understood by those skilled in the art that various modifications, combinations, sub-combinations and alternations may occur depending on design requirements and other factors insofar as they are within the scope of the appended claims or the equivalents thereof.

What is claimed is:

1. An image pickup lens comprising:
    a substrate having a first surface and a second surface which is opposite the first surface;
    a first resin layer and a second resin layer, in which the first resin layer is formed on the first surface of the substrate and the second resin layer is formed on the second surface of the substrate;
    a first lens portion and a second lens portion, in which the first lens portion is formed on the first surface of the substrate and the second lens portion is formed on the second surface of the substrate; and
    a first spacer and a second spacer, in which the first spacer is formed integrally on the first surface of the substrate at an area surrounding the first lens portion and the second spacer is formed integrally on the second surface of the substrate at an area surrounding the second lens portion,
    in which each of the first lens portion and the second lens portion has a same one of a convex shape or a concave shape such that each of the first lens portion and the second lens portion has the convex shape or each of the first lens portion and the second lens portion has the concave shape.

2. The image pickup lens according to claim 1, wherein the substrate is set in a mold, then a resin material is injected into the mold and cured, and thereafter the mold is demolded, whereby the first and second resin layers are simultaneously formed on the first and second surfaces of the substrate.

3. The image pickup lens according to claim 2, wherein the resin material is a thermosetting resin.

4. The image pickup lens according to claim 2, wherein at least one of the first spacer and the second spacer is formed at an outer circumferential portion of an end portion with a notched portion in which an adhesive is filled.

5. The image pickup lens according to claim 2, wherein an infrared reflective film is formed to cover at least one of the first lens portion and the second lens portion.

6. The image pickup lens according to claim 2, wherein an infrared absorbent is dispersed in the resin material.

7. A camera module comprising:
    an image pickup lens including a substrate having a first surface and a second surface which is opposite the first surface, a first resin layer and a second resin layer in which the first resin layer is formed on the first surface of the substrate and the second resin layer is formed on the second surface of the substrate, a first lens portion and a second lens portion in which the first lens portion is formed on the first surface of the substrate and the second lens portion is formed on the second surface of the substrate, and a first spacer and a second spacer in which the first spacer is formed integrally on the first surface of the substrate at an area surrounding the first lens portion and the second spacer is formed integrally on the second surface of the substrate at an area surrounding the second lens portion, in which each of the first lens portion and the second lens portion has a same one of a convex shape or a concave shape such that each of the first lens portion and the second lens portion has the convex shape or each of the first lens portion and the second lens portion has the concave shape; and
    an image pickup substrate formed with an image pickup device,
    wherein the image pickup lens and the image pickup substrate are integrally stacked one on another with optical axes thereof aligned with each other by butting one of the first spacer or the second spacer of the image pickup lens against the image pickup substrate.

8. The camera module according to claim 7, wherein the image pickup lens is such that the substrate is set in a mold, then a resin material is injected into the mold and cured, and thereafter the mold is demolded, whereby the first and second resin layers are simultaneously formed on the first and second surfaces of the substrate.

9. The camera module according to claim 8, wherein one of the first spacer or the second spacer is formed at an outer circumferential portion of an end portion with a notched portion in which an adhesive is filled.

10. The camera module according to claim 8, wherein the resin material is a thermosetting resin.

11. The camera module according to claim 8, wherein an infrared reflective film is formed to cover at least one of the first lens portion and the second lens portion.

12. The camera module according to claim 8, wherein an infrared absorbent is dispersed in the resin material.

13. An image pickup lens manufacturing method, comprising the steps of:
    setting a substrate having a first surface and a second surface which is opposite the first surface in a mold, then injecting a resin material into the mold for curing, and thereafter demolding the mold, for simultaneously forming a first resin layer and a second resin layer in which the first resin layer is formed on the first surface of the substrate and the second resin layer is formed on the second surface of the substrate; and
    simultaneously forming a first lens portion and a second lens portion in which the first lens portion is formed on the first surface of the substrate and the second lens portion is formed on the second surface of the substrate, and a first spacer and a second spacer in which the first spacer is formed integrally on the first surface of the substrate at an area surrounding the first lens portion and the second spacer is formed integrally on the second surface of the substrate at an area surrounding the second lens portion, in which each of the first lens portion and the second lens portion has a same one of a convex shape or a concave shape such that each of the first lens portion and the second lens portion has the convex shape or each of the first lens portion and the second lens portion has the concave shape.

14. The image pickup lens manufacturing method according to claim 13, wherein the image pickup lens is formed, by means of the mold, as an image pickup lens wafer.

15. The image pickup lens manufacturing method according to claim 14, wherein
the resin material is a thermosetting resin.

* * * * *